(12) United States Patent
Lee et al.

(10) Patent No.: US 9,386,652 B1
(45) Date of Patent: Jul. 5, 2016

(54) DRIVING CIRCUIT FOR LIGHT-EMITTING DIODES

(71) Applicants: KINPO ELECTRONICS, INC., New Taipei (TW); CAL-COMP ELECTRONICS & COMMUNICATIONS COMPANY LIMITED, New Taipei (TW)

(72) Inventors: Kuan-Han Lee, New Taipei (TW); Chin-Chao Hsu, New Taipei (TW)

(73) Assignees: KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 0 days.

(21) Appl. No.: 14/749,478

(22) Filed: Jun. 24, 2015

(30) Foreign Application Priority Data

May 4, 2015 (TW) .............................. 104114125 A

(51) Int. Cl.
*H05B 37/02* (2006.01)
*H05B 33/08* (2006.01)

(52) U.S. Cl.
CPC ........ *H05B 33/0851* (2013.01); *H05B 33/0815* (2013.01)

(58) Field of Classification Search
CPC .... H05B 37/02; H05B 33/08; H05B 33/0806; H05B 33/0812; H05B 33/0815; H05B 33/0842; H05B 33/0875
USPC .......... 315/200 R, 209 R, 224–226, 291–297, 315/307, 308, 312
See application file for complete search history.

(56) References Cited

U.S. PATENT DOCUMENTS 8,754,879 B2 * 6/2014 Lee ...................... G09G 3/2092
315/291

* cited by examiner

*Primary Examiner* — Jimmy Vu
(74) *Attorney, Agent, or Firm* — Muncy, Geissler, Olds & Lowe, P.C.

(57) ABSTRACT

A driving circuit for light-emitting diodes includes a power unit providing an input voltage, a voltage regulation unit providing a voltage-increasing loop and a voltage-decreasing loop and having an energy-storing capacitor with an intermediate voltage therebetween, a current control unit generating a driving current for the light-emitting diodes according to the intermediate voltage, and a switching control unit. The switching control unit generates a reference voltage based on the input voltage and compares the reference voltage with a feedback voltage associated with driving current. The switching control unit controls the voltage regulation unit to increase the intermediate voltage through the voltage-increasing loop when the feedback voltage is smaller than the reference voltage. The switching control unit controls the voltage regulation unit to decrease the intermediate voltage through the voltage-decreasing loop when the feedback voltage is larger than the reference voltage.

15 Claims, 6 Drawing Sheets

DRIVING CIRCUIT FOR LIGHT-EMITTING DIODES

BACKGROUND OF THE INVENTION

1. Technical Field

The technical field relates to a driving circuit for light-emitting diodes (LEDs), and especially to a driving circuit used for LEDs and adapted to input voltages of various magnitudes.

2. Description of Related Art

In LED lighting system, driving circuit is crucial account for the performance and the cost of overall system, therefore, the design of driving circuit is important issue for the LED lighting system.

Linear driver is one of major driving schemes for LED lighting system and has advantages of simple design and immunity to electromagnetic interference (EMI).

However, the current linear driver for LED lighting system has demanding requirement for matching between input and output voltages. Namely, the linear driver fails to work when the overall forward voltage of the LED is higher than the input voltage. On the contrary, the transistor switch (generally MOSFET switch or BJT switch) in series with the LED will have large voltage stress when the overall forward voltage of the LED is excessively lower than the input voltage.

Preferably, the overall forward voltage of the LED is slightly lower than the input voltage for the LED lighting system worked in high AC input voltages such as 200~240 volts, whereby the LED lighting system can work normally and the voltage stress for the MOSFET switch or BJT switch can be reduced. Nevertheless, the above high AC-input LED lighting system cannot work in low AC-input application (such as 100~120 volts) because the input voltage is generally lower than the overall forward voltage of the LED.

FIG. 1 shows a related art linear driver for LED lighting system, a bridge rectifier 10A rectifies an AC input Vac into an input voltage Vin. The LED strings 21A and 22A are electrically connected to constant-current circuits 31A and 32A, respectively and the constant-current circuits 31A and 32A control the current flowing through the LED strings 21A and 22A via corresponding transistor switches $Q_{1A}$ and $Q_{2A}$ in order to drive the LED strings 21A and 22A as pure resistive load.

However, in above-mentioned related art linear driver for LED lighting system, considerable voltage drop is across the transistor switches $Q_{1A}$ and $Q_{2A}$ in the constant-current circuits 31A and 32A when the input voltage is much higher than the driving voltage $V_{LED}$ of the LED strings 21A and 22A. The power dissipation associated with the voltage drop $V_Q$ is absorbed by the transistor switches $Q_{1A}$ and $Q_{2A}$. The transistor switches $Q_{1A}$ and $Q_{2A}$ has risk of damage when the power dissipation thereof is excessively high. On the contrary, the LED strings 21A and 22A cannot be turned on when the input voltage Vac is lower than the driving voltage $V_{LED}$ of the LED strings 21A and 22A The commercially available LED lamps are generally classified in terms of different input voltages corresponding to different countries/regions such that the LED lamp can satisfy rated voltage in the selling countries/regions. Namely, the LED lamp with single specification cannot be used for worldwide voltage. It is inconvenient for user to spend extra cost to buy lamp suitable for local region. For circuit designer, more labor and cost are needed to develop LED lamps adapted for the various voltages of different regions.

Therefore, it is desirable to provide a driving circuit for LED, which can maintain constant current and voltage operation for the LED module and meet the input/output matching requirement for linear driver as well as render the LED applicable to worldwide voltage.

SUMMARY OF THE INVENTION

The disclosure is directed to a driving circuit for LED to overcome above drawbacks. In one of the exemplary embodiments, the driving circuit for LED comprises a power source for providing an input voltage; a voltage regulator electrically connected to the power source and the LED module, the voltage regulator providing a voltage-increasing loop and a voltage-decreasing loop and having an energy-storing capacitor with an intermediate voltage therebetween; a current control unit electrically connected to the voltage regulator and the LED module, the current control unit generating a driving current for the light-emitting diodes according to the intermediate voltage; and a switching control unit electrically connected to the power source, the voltage regulator and the current control unit, the switching control unit configured to generate a reference voltage based on the input voltage and to compare the reference voltage with a feedback voltage associated with driving current; wherein the switching control unit controls the voltage regulation unit to increase the intermediate voltage through the voltage-increasing loop when the feedback voltage is smaller than the reference voltage, the switching control unit controls the voltage regulation unit to decrease the intermediate voltage through the voltage-decreasing loop when the feedback voltage is larger than the reference voltage.

DETAILED DESCRIPTION OF THE INVENTION

In cooperation with the attached drawings, the technical contents and detailed description of the present invention are described thereinafter according to preferable embodiment (s), being not used to limit its executing scope. Any equivalent variation and modification made according to appended claims is all covered by the claims claimed by the present invention.

Figure 1:
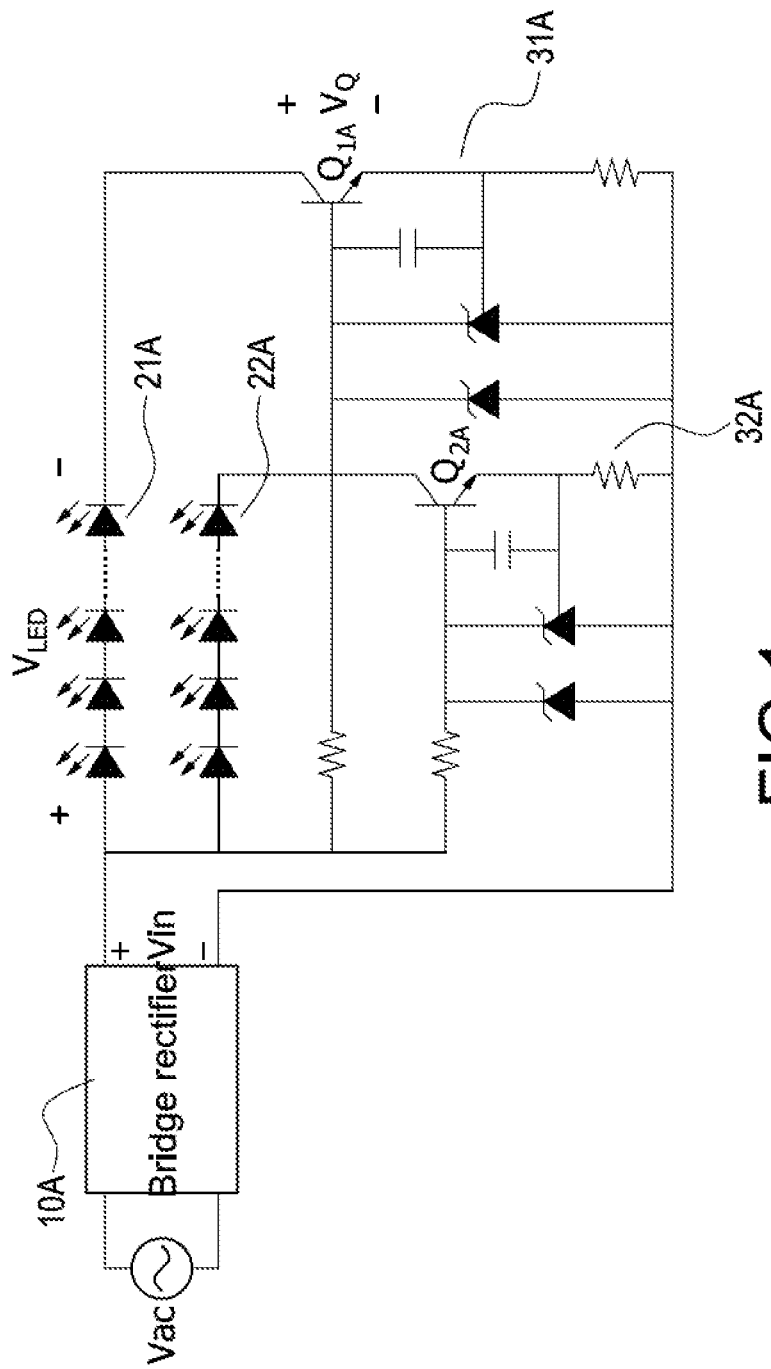
FIG. 1 shows a related art linear driver for LED lighting system.
Figure 2:
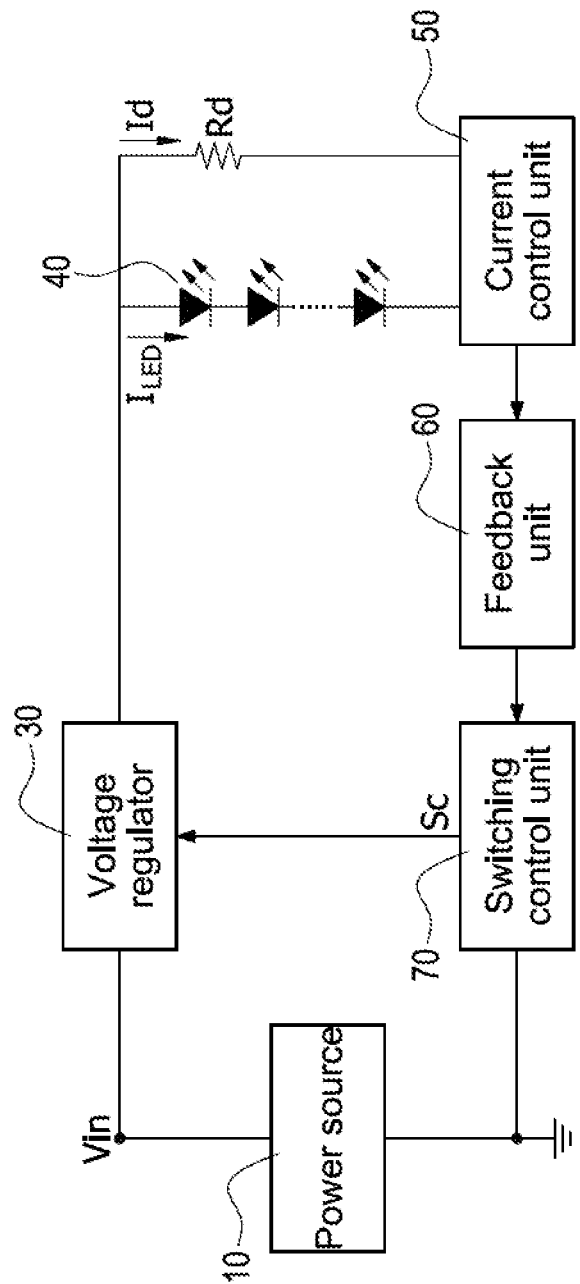
FIG. 2 shows the block diagram of the driving circuit for LED according to the present disclosure.

FIG. 2 shows the block diagram of the driving circuit for LED (hereinafter briefed as driving circuit) according to the present disclosure. The driving circuit is used for LED module 40 comprising a plurality of LEDs. The driving circuit mainly comprises a power source 10, a voltage regulator 30, a current control unit 50 and a switching control unit 70.

The power source 10 provides an input voltage Vin. The voltage regulator 30 is electrically connected to the power source 10 and the LED module 40 and comprises an energy-storing capacitor Cd. Depending on the input voltage Vin, the voltage regulator 30 generates a charging current Ic for charging energy-storing capacitor Cd. Alternatively, the energy-storing capacitor Cd generates a discharging current Id, depending on the input voltage Vin. The current control unit 50 is electrically connected to the voltage regulator 30 and the LED module 40, and adapted to generate a driving current $I_{LED}$ for the LED module 40 when the discharging current Id reaches a current threshold. The current control unit 50 is adapted to maintain constant current driving for the LED module 40. The switching control unit 70 is electrically connected to the power source 10, the voltage regulator 30 and the current control unit 50, and receives a feedback voltage Vfb associated with the driving current $I_{LED}$ for the LED module 40. The switching control unit 70 controls the voltage regulator 30 to stop generating the charging current Ic when the feedback voltage Vfb reaches a reference voltage.

According to one example, the power source 10 receives an external AC power and employs a bridge rectifier and a filter to respectively rectify and filter the external AC power, thus providing the input voltage Vin. Namely, the input voltage Vin is generated through voltage conversion, rectification and filtering. According to another example, the input voltage Vin may be provided by a DC power source. The voltage regulator 30 is used to regulate the input voltage Vin, namely the AC power source, to maintain constant current and constant voltage driving for the LED module 40, thus matching the input/output voltage for the LED driving circuit.

Moreover, the driving circuit further comprises a feedback unit 60 electrically connected to the current control unit 50 and the switching control unit 70, and used to convert the driving current $I_{LED}$ to the feedback voltage Vfb. More particularly, the feedback unit 60 senses the driving current $I_{LED}$ flowing through the LED module 40 and converts the sensed driving current $I_{LED}$ to the feedback voltage Vfb. The feedback unit 60 further provides the feedback voltage Vfb to the switching control unit 70 and the switching control unit 70 correspondingly generates a control signal Sc for controlling the voltage regulator 30. In this manner, the voltage regulator 30 regulates the driving voltage for the LED module 40 such that the requirement for constant current and constant voltage driving, and input/output matching can be met. The description of the driving circuit, especially the voltage regulator 30, will be detailed later.

Figure 3:
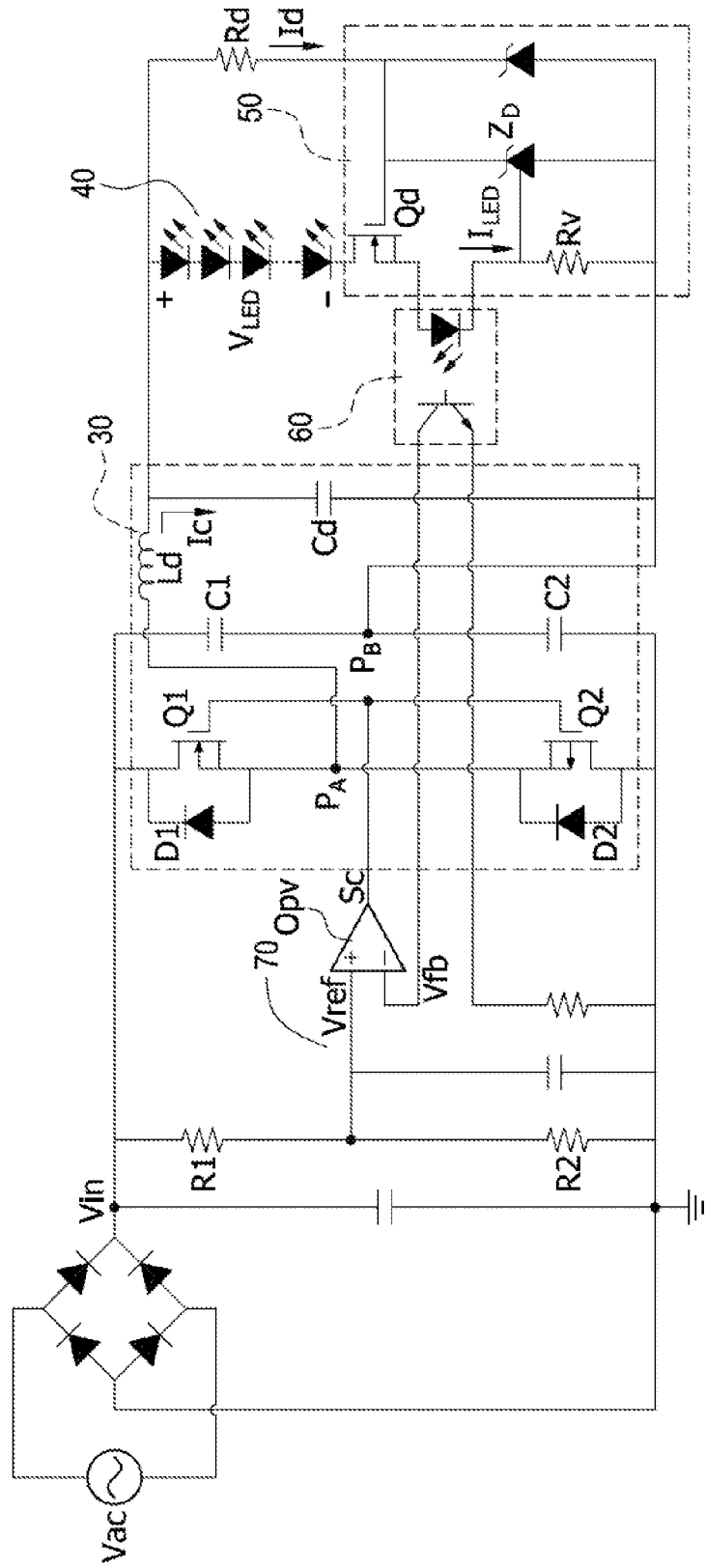
FIG. 3 shows the circuit diagram of the driving circuit according to the first embodiment the present disclosure.

FIG. 3 shows the circuit diagram of the driving circuit according to the first embodiment the present disclosure. The voltage regulator 30 comprises a first transistor switch Q1, a second transistor switch Q2, an inductor Ld, and an energy-storing capacitor Cd. The voltage regulator 30 provides a voltage-increasing loop and a voltage-decreasing loop, where the voltage-increasing loop has a first voltage-increasing path and a second voltage-increasing path, and the voltage-decreasing loop has a first voltage-decreasing path and a second voltage-decreasing path. The more detailed description for the voltage-increasing loop and the voltage-decreasing loop will be made later with reference to FIGS. 4 to 7.

The first transistor switch Q1 is parallel connected to a first diode D1, and the second transistor switch Q2 is parallel connected to a second diode D2, where the first transistor switch Q1 and the second transistor switch Q2 are connected at a first common node $P_A$ and the first transistor switch Q1 and the second transistor switch Q2 are further connected, respectively through a first capacitor C1 and a second capacitor C2 to a second common node $P_B$.

The inductor Ld has a first end connected to the first common node $P_A$ and a second end. The energy-storing capacitor Cd has a first end connected to the second end of the inductor Ld and the anode of the LED module 40 and a second end connected to the second common node $P_B$ and the current control unit 50. An intermediate voltage is defined between the first end and the second end of the energy-storing capacitor Cd.

The first transistor switch Q1 and the second transistor switch Q2 can be realized by MOSFET or BJT. In the shown embodiment, the first transistor switch Q1 and the second transistor switch Q2 are MOSFET switches and the gates of the first transistor switch Q1 and the second transistor switch Q2 are connected to each other to receive the control signal Sc from the switching control unit 70 such that the first transistor switch Q1 and the second transistor switch Q2 can be controlled by the control signal Sc.

The switching control unit 70 mainly comprises a voltage comparator Qpv and a voltage-division resistor network. The voltage-division resistor network comprises a first voltage-division resistor R1 and a second voltage-division resistor R2 in series with the first voltage-division resistor R1. The input voltage Vin is applied to the series-connected first voltage-division resistor R1 and second voltage-division resistor R2 such that a reference voltage, which is a divided voltage of the input voltage Vin, is present across the second voltage-division resistor R2.

The invert input end of the voltage comparator Qpv receives the feedback voltage Vfb and the non-invert input end of the voltage comparator Qpv receives the reference voltage Vref such that the voltage comparator Qpv compares the feedback voltage Vfb with the reference voltage Vref. The voltage comparator Qpv outputs the control signal Sc of high level when the reference voltage Vref is larger than the feedback voltage Vfb. The voltage comparator Qpv outputs the control signal Sc of low level when the reference voltage Vref is equivalent to or smaller than the feedback voltage Vfb. In this way, the switching control unit 70 controls the first transistor switch Q1 and the second transistor switch Q2 of the voltage regulator 30 to regulate the input voltage Vin. Therefore, the LED module 40 can be adapted to input voltages of various magnitudes and maintain constant-voltage and constant-current operation. Moreover, the first transistor switch Q1 can be an NPN MOSFET while the second transistor switch Q2 can be a PNP MOSFET. Alternatively, the first transistor switch Q1 can be a PNP MOSFET while the second transistor switch Q2 can be an NPN MOSFET. In latter embodiment, the invert input end of the voltage comparator Qpv receives the reference voltage Vref and the non-invert input end of the voltage comparator Qpv receives the feedback voltage Vfb.

In the embodiment shown in FIG. 3, the switching control unit 70 is realized by an LED driver IC. The feedback unit 60 is realized by an optical coupler, which detects the driving current $I_{LED}$ for the LED module 40 and then generates corresponding feedback voltage Vfb. The feedback voltage Vfb is sent to the voltage comparator Qpv to compare with the reference voltage Vref. The current control unit 50 comprises a voltage-stabilization diode $Z_D$, and a voltage-stabilization resistor Rv. The voltage-stabilization diode $Z_D$ is, for example, a Zener diode to stabilize the source of the switch Qd. More particularly, the voltage-stabilization diode $Z_D$ can provide a stabilization voltage of 2.5V. The current control unit 50 is electrically connected to the intermediate voltage through a resistor Rd such that the driving current $I_{LED}$ for the LED module 40 is relevant to the intermediate voltage. More particularly, when the LED module 40 is in normal lighting operation, the voltage-stabilization diode ZD, and the voltage-stabilization resistor Rv can be used to provide constant driving current $I_{LED}$ for the LED module 40, which is the ratio between the stabilization voltage (such as 2.5V) and the voltage-stabilization resistor Rv.

FIGS. 4 to 7 show the circuit diagrams for the voltage regulator 30 in different operation modes. To simplify description, the first transistor switch Q1 is an NPN MOSFET while the second transistor switch Q2 is a PNP MOSFET. Moreover, in FIGS. 4 to 7 the symbol Vin indicates an equivalent voltage of the AC input Vac after rectifying and filtering, and the output control signal Sc of the switching control unit 70 directly controls the gates of the first transistor switch Q1 and the second transistor switch Q2.

Figure 4:
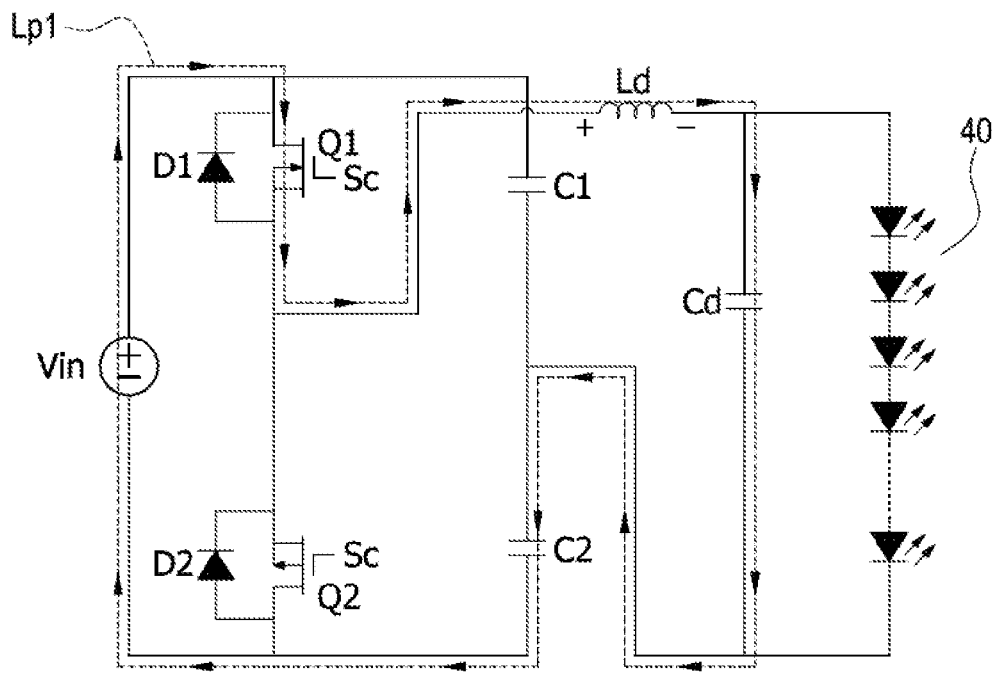
FIG. 4 shows the voltage regulator operated in the first operation mode.

FIG. 4 shows the voltage regulator 30 operated in the first mode, where the AC input Vac starts to activate the driving circuit and no current flows through the LED module 40 due to non-conduction of the LED module 40. At this time, the input voltage Vin charges the inductor Ld and the energy-storing capacitor Cd as well as the resistor Rd (shown in FIG. 3) such that a discharging current Id through the resistor Rd increases.

At this time, the feedback voltage Vfb sent to the voltage comparator Qpv is smaller than the reference voltage Vref (voltage division of Vin by the first voltage-division resistor R1 and the second voltage-division resistor R2) due to zero driving current $I_{LED}$ through the LED module 40. Therefore, the voltage comparator Qpv output high-level control signal Sc to turn on the first transistor switch Q1 and turn off the second transistor switch Q2.

As shown in FIG. 4, in this operation mode, the driving circuit provides a first voltage-increasing path Lp1 including, in sequence, the input voltage Vin, the first transistor switch Q1, the inductor Ld, the energy-storing capacitor Cd, the capacitor C2 and then back to the input voltage Vin. In this mode, the inductor Ld and the energy-storing capacitor Cd are in energy-storing operation and the voltage $V_{LED}$ of the LED module 40 increases gradually due to the continual charging of the inductor Ld and the energy-storing capacitor Cd.

Moreover, the voltage comparator Qpv continues outputting high-level control signal Sc to turn on the first transistor switch Q1 and turn off the second transistor switch Q2 when the feedback voltage Vfb is still smaller than the reference voltage Vref, thus still increasing the discharging current Id.

Figure 5:
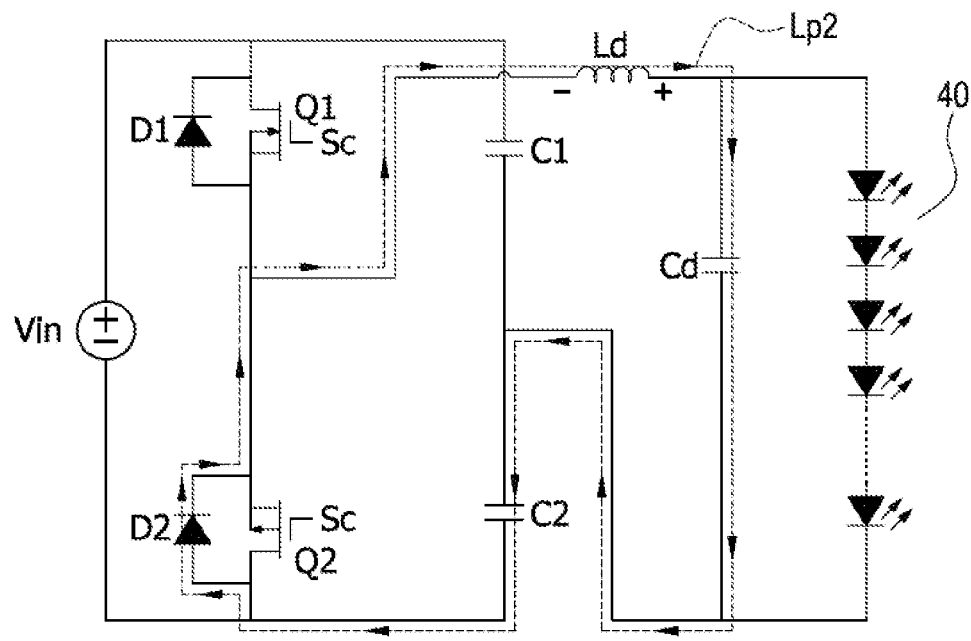
FIG. 5 shows the voltage regulator operated in the second operation mode.

As shown in FIG. 5, the driving circuit is operated in the second operation mode. More particularly, the LED module 40 starts to turn on and the driving current $I_{LED}$ for the LED module 40 starts to increase when the discharging current Id such increases that the driving voltage (the product of the discharging current Id and the resistor Rd) is large enough to turn on the switch Qd in serial connection with the LED module 40 (shown in FIG. 3).

At this time, the LED module 40 is normally driven for lighting and the voltage comparator Qpv outputs the control signal Sc to turn off both the first transistor switch Q1 and the second transistor switch Q2 such that the inductor Ld and the energy-storing capacitor Cd are in energy-releasing operation. As shown in FIG. 5, in this operation mode, the driving circuit provides a second voltage-increasing path Lp2 including, in sequence, the inductor Ld, the energy-storing capacitor Cd, the capacitor C2, the second diode D2 and then back to the inductor Ld.

Figure 6:
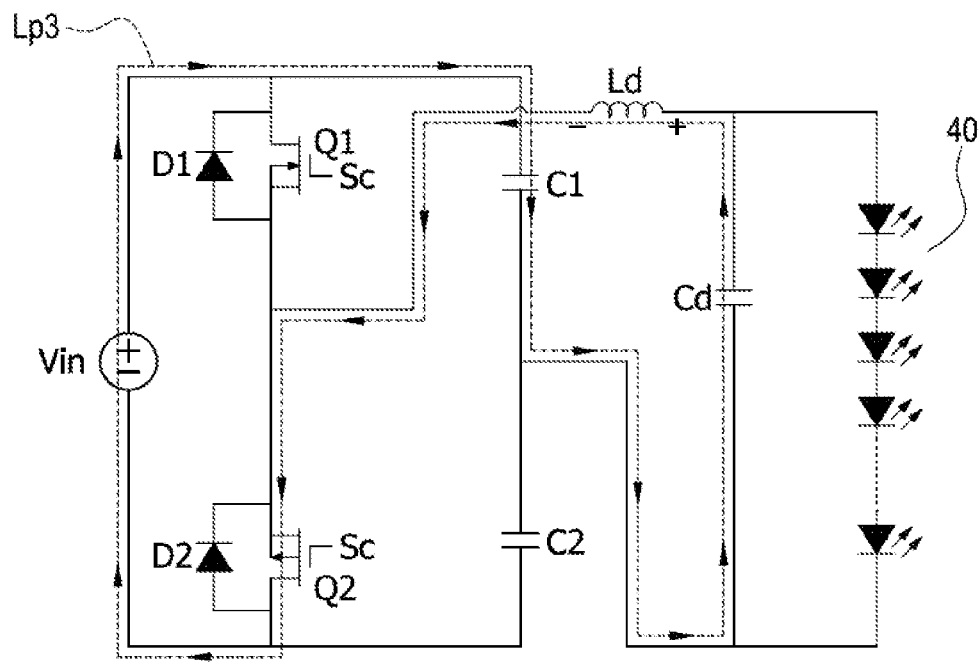
FIG. 6 shows the voltage regulator operated in the third operation mode.

As shown in FIG. 6, the driving circuit is operated in the third operation mode. More particularly, during the continual lighting of the LED module 40, the feedback unit 60 may sense an excessive driving current $I_{LED}$, which induces an excessive voltage $V_{LED}$. At this time, the feedback voltage Vfb sent to the voltage comparator Qpv is larger than the reference voltage Vref and the voltage comparator Qpv generates low-level control signal Sc to turn off the first transistor switch Q1 and turn on the second transistor switch Q2. The LED module 40 in this mode is not conducted due to excessive voltage $V_{LED}$.

As shown in FIG. 6, in this operation mode, the driving circuit provides a first voltage-decreasing path Lp3 including, in sequence, the input voltage Vin, the capacitor C1, the energy-storing capacitor Cd, the inductor Ld, the second transistor switch Q2 and then back to the input voltage Vin. In this mode, the voltage regulator 30 controls the voltage $V_{LED}$ to decrease such that the LED module 40 can be operated in constant driving voltage.

Figure 7:
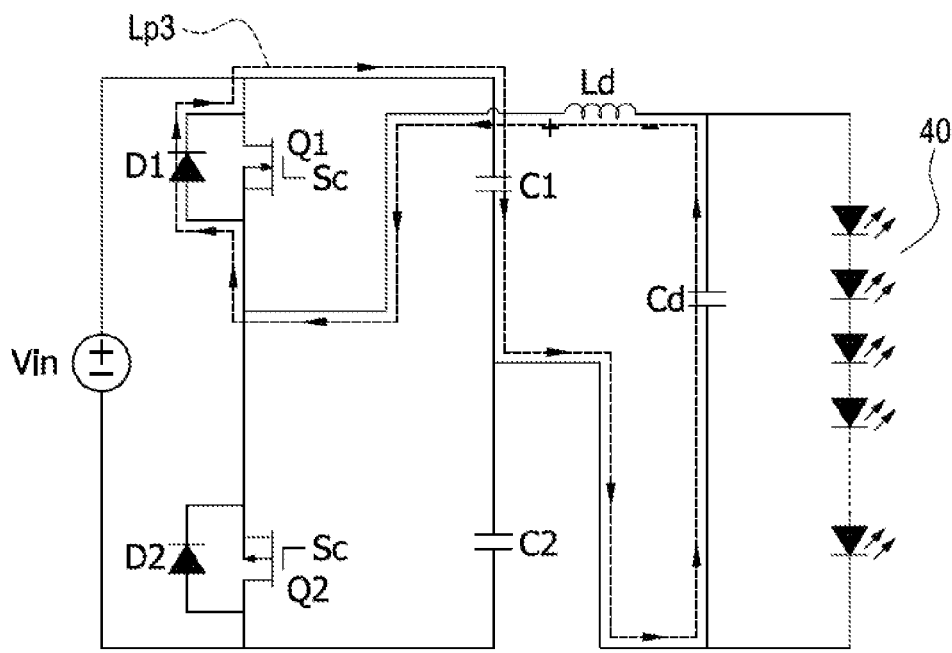
FIG. 7 shows the voltage regulator operated in the fourth operation mode.

As shown in FIG. 7, the driving circuit is operated in the fourth operation mode. More particularly, the voltage $V_{LED}$ is such decreased that the LED module 40 has normal lighting operation. The voltage comparator Qpv generates the control signal Sc to turn off both the first transistor switch Q1 and the second transistor switch Q2. As shown in FIG. 7, in this operation mode, the driving circuit provides a second voltage-decreasing path Lp4 including, in sequence, the energy-storing capacitor Cd, the inductor Ld, the first diode D1, the capacitor C1, and then back to the energy-storing capacitor Cd.

The switching control unit 70 can use schemes other than those shown in FIGS. 4 to 7 to control the voltage regulator 30. The other implementation ways can be exemplified as follows:

(1) The first transistor switch Q1 is a PNP MOSFET while the second transistor switch Q2 is an NPN MOSFET, and vice versa, while both switches are controlled by the control signal Sc of the switching control unit 70.

(2) Both of the first transistor switch Q1 and the second transistor switch Q2 can be the same type of MOSFET, namely PNP MOSFET or NPN MOSFET, while the switching control unit 70 generates control signals of opposite levels to respectively control the first transistor switch Q1 and the second transistor switch Q2.

(3) Both of the first transistor switch Q1 and the second transistor switch Q2 can be the same type of MOSFET, namely PNP MOSFET or NPN MOSFET, while the switching control unit 70 generates a control signal used with a level inverter to control the first transistor switch Q1 and the second transistor switch Q2 with two signals of opposite levels.

Figure 8:
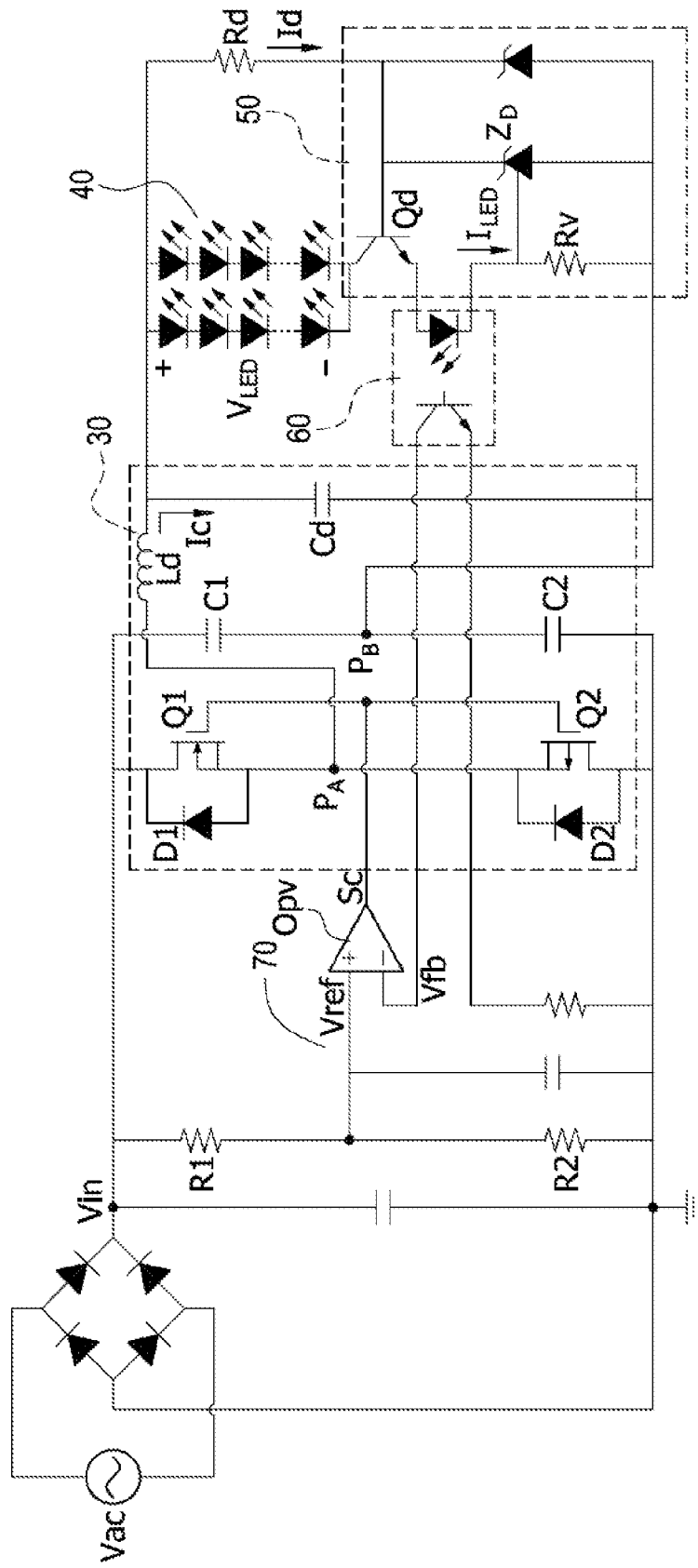
FIG. 8 shows the circuit diagram of the driving circuit according to the second embodiment of the present disclosure.

FIG. 8 shows the circuit diagram of the driving circuit according to the second embodiment of the present disclosure. The second embodiment is similar to the first embodiment except that the second embodiment has a plurality of LED modules 40 and each of the LED modules 40 can keep constant-current and constant-voltage operation. In this embodiment, the transistor switch Qd used by the current control unit 50 is realized by bipolar transistor. Similarly, the voltage-stabilization diode $Z_D$ also provide a stabilization voltage of 2.5V and cooperates with the voltage-stabilization resistor Rv to provide a constant LED driving current $I_{LED}$. The operation of the driving circuit shown in FIG. 8 is similar to that of FIG. 3 and the detailed description thereof is omitted here for brevity.

To sum up, the driving circuit for LED of the present disclosure has following advantages:

1. The voltage regulator 30 can advantageously adjust the input voltage to maintain constant voltage and constant current driving for the LED module, thus solving the matching issue between input and output of linear driving circuit.

2. The voltage regulator 30 can adapt the driving circuit of the present disclosure to various input voltages such that the LED lamp with the driving circuit can be used with worldwide voltage.

3. The user can save the extra cost for LED lamp and the LED driver designer can save R&D labor and cost.

As the skilled person will appreciate, various changes and modifications can be made to the described embodiment. It is intended to include all such variations, modifications and equivalents which fall within the scope of the present invention, as defined in the accompanying claims.

What is claimed is:

1. A driving circuit for light-emitting diodes (LED) driving an LED module comprising a plurality of LEDs, the driving circuit comprising:
    a power source for providing an input voltage;
    a voltage regulator electrically connected to the power source and the LED module, the voltage regulator providing a voltage-increasing loop and a voltage-decreasing loop and having an energy-storing capacitor with an intermediate voltage therebetween;
    a current control unit electrically connected to the voltage regulator and the LED module, the current control unit generating a driving current for the light-emitting diodes according to the intermediate voltage; and
    a switching control unit electrically connected to the power source, the voltage regulator and the current control unit, the switching control unit configured to generate a reference voltage based on the input voltage and to compare the reference voltage with a feedback voltage associated with driving current;
    wherein the switching control unit controls the voltage regulation unit to increase the intermediate voltage through the voltage-increasing loop when the feedback voltage is smaller than the reference voltage, the switching control unit controls the voltage regulation unit to decrease the intermediate voltage through the voltage-decreasing loop when the feedback voltage is larger than the reference voltage.

2. The driving circuit in claim 1, wherein the voltage regulator comprises:
    a first transistor switch parallel connected to a first diode;
    a second transistor switch parallel connected to a second diode and serially connected to the first transistor switch at a first common node, the first transistor switch and the second transistor switch connected at a second common node;
    an inductor having a first end electrically connected to the first common node and a second end;
    wherein the energy-storing capacitor has a first end electrically connected to the second end of the inductor and an anode of the LED module, and a second end electrically connected to the second common node and the current control unit.

3. The driving circuit in claim 1, wherein the switching control unit comprises:
    a voltage-division resistor network comprising a first voltage-division resistor and a second voltage-division resistor in series with the first voltage-division resistor, the voltage-division resistor network electrically connected to the input voltage such that the reference voltage is present across the second voltage-division resistor; and
    a voltage comparator receiving the feedback voltage and the reference voltage, the voltage comparator and configured to compare the feedback voltage with the reference voltage,
    wherein the voltage comparator generates a high-level control signal when the reference voltage is larger than the feedback voltage, the voltage comparator generates a low-level control signal when the reference voltage is equal to or smaller than the feedback voltage.

4. The driving circuit in claim 1, wherein the current control unit comprises:
    a transistor switch electrically connected to the LED module;
    a voltage-stabilization diode electrically connected to the transistor switch and the energy-storing capacitor, the voltage-stabilization diode providing a stabilization voltage according to the intermediate voltage; and
    a voltage-stabilization resistor electrically connected to the voltage-stabilization diode and providing a constant current corresponding to the stabilization voltage.

5. The driving circuit in claim 1, further comprising a feedback unit electrically connected between the current control unit and the switching control unit and configured to generate the feedback voltage according to the driving current.

6. The driving circuit in claim 2, wherein the first transistor switch is an NPN MOSFET and the second transistor switch is a PNP MOSFET, wherein the first transistor switch is turned on and the second transistor switch is turned off when the control signal is of high level, wherein the first transistor switch is turned off and the second transistor switch is turned on when the control signal is of low level.

7. The driving circuit in claim 2, wherein the first transistor switch is a PNP MOSFET and the second transistor switch is an NPN MOSFET, wherein the first transistor switch is turned off and the second transistor switch is turned on when the control signal is of high level, wherein the first transistor switch is turned on and the second transistor switch is turned off when the control signal is of low level.

8. The driving circuit in claim 6, wherein the driving circuit provides a first voltage-increasing path when the first transistor switch is turned on and the second transistor switch is turned off, the first voltage-increasing path is constituted by the input voltage, the first transistor switch, the inductor, and the energy-storing capacitor, the first voltage-increasing path providing a path to increase the driving current for the LED module.

9. The driving circuit in claim 6, wherein the driving circuit provides a second voltage-increasing path when the first transistor switch is turned off and the second transistor switch is turned off, the second voltage-increasing path is constituted by the inductor, the energy-storing capacitor, and the second diode, the second voltage-increasing path providing an energy-releasing path for the inductor and the energy-storing capacitor.

10. The driving circuit in claim 6, wherein the driving circuit provides a first voltage-decreasing path when the first transistor switch is turned off and the second transistor switch is turned on, the first voltage-decreasing path is constituted by the input voltage, the energy-storing capacitor, the inductor and the second transistor switch, the first voltage-decreasing path providing a path to decrease the driving current for the LED module.

11. The driving circuit in claim 6, wherein the driving circuit provides a second voltage-decreasing path when the first transistor switch is turned off and the second transistor switch is turned off, the second voltage-decreasing path is constituted by the he energy-storing capacitor, the inductor, and the first diode, the second voltage-increasing path providing an energy-releasing path for the inductor and the energy-storing capacitor.

12. The driving circuit in claim 7, wherein the driving circuit provides a first voltage-increasing path when the first transistor switch is turned on and the second transistor switch is turned off, the first voltage-increasing path is constituted by the input voltage, the first transistor switch, the inductor, and the energy-storing capacitor, the first voltage-increasing path providing a path to increase the driving current for the LED module.

13. The driving circuit in claim 7, wherein the driving circuit provides a second voltage-increasing path when the first transistor switch is turned off and the second transistor switch is turned off, the second voltage-increasing path is constituted by the inductor, the energy-storing capacitor, and the second diode, the second voltage-increasing path providing an energy-releasing path for the inductor and the energy-storing capacitor.

14. The driving circuit in claim 7, wherein the driving circuit provides a first voltage-decreasing path when the first transistor switch is turned off and the second transistor switch is turned on, the first voltage-decreasing path is constituted by the input voltage, the energy-storing capacitor, the inductor and the second transistor switch, the first voltage-decreasing path providing a path to decrease the driving current for the LED module.

15. The driving circuit in claim 7, wherein the driving circuit provides a second voltage-decreasing path when the first transistor switch is turned off and the second transistor switch is turned off, the second voltage-decreasing path is constituted by the he energy-storing capacitor, the inductor, and the first diode, the second voltage-increasing path providing an energy-releasing path for the inductor and the energy-storing capacitor.

* * * * *